(12) United States Patent
Tani et al.

(10) Patent No.: US 8,250,730 B2
(45) Date of Patent: Aug. 28, 2012

(54) METHOD AND APPARATUS FOR DISASSEMBLING DISPLAY DEVICE

(75) Inventors: Yoshiyuki Tani, Osaka (JP); Hiroshi Iwamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 232 days.

(21) Appl. No.: 12/674,273

(22) PCT Filed: Oct. 14, 2008

(86) PCT No.: PCT/JP2008/002893
§ 371 (c)(1),
(2), (4) Date: Feb. 19, 2010

(87) PCT Pub. No.: WO2009/050875
PCT Pub. Date: Apr. 23, 2009

(65) Prior Publication Data
US 2011/0167615 A1 Jul. 14, 2011

(30) Foreign Application Priority Data

Oct. 15, 2007 (JP) .................................. 2007-267589

(51) Int. Cl.
*G01R 31/28* (2006.01)
(52) U.S. Cl. ................ 29/593; 29/835; 29/846; 29/854; 29/871; 29/873; 216/62; 216/65; 216/66; 349/149; 349/150; 349/151; 349/152; 445/24
(58) Field of Classification Search ................. 29/592.1, 29/593, 602.1, 729, 739–742, 831, 835, 846, 29/854, 871–873; 349/149–152; 216/62, 216/65, 66; 445/24
See application file for complete search history.

(56) References Cited

U.S. PATENT DOCUMENTS 6,929,476 B2 * 8/2005 Katsuda et al. ................. 433/98

FOREIGN PATENT DOCUMENTS

| JP | 09083686 A | * | 3/1997 |
|----|------------|---|--------|
| JP | 2004-184677 A | | 7/2004 |
| JP | 2006-243184 A | | 9/2006 |
| JP | 2006-320783 A | | 11/2006 |
| JP | 2006-330205 A | | 12/2006 |

OTHER PUBLICATIONS

International Search Report for PCT/JP2008/002893, Nov. 18, 2008.

* cited by examiner

*Primary Examiner* — Paul D Kim
(74) *Attorney, Agent, or Firm* — RatnerPrestia

(57) ABSTRACT

In the disassembling method of a display device of the present invention, the display device has a display panel, and metal plate unit having a panel member formed of a chassis member disposed on the back surface of the display panel and a circuit board as an electric circuit member attached to the chassis member through an attaching member. The disassembling method has a mounting step of mounting metal plate unit on stage whose tilt angle can be adjusted by mechanism section and a cutting step of cutting the attaching member in parallel with the surface of stage with saw blade that abuts on the attaching member by the own weight of metal plate unit based on the tilt angle of stage.

11 Claims, 9 Drawing Sheets

FIG. 8A
FIG. 8B
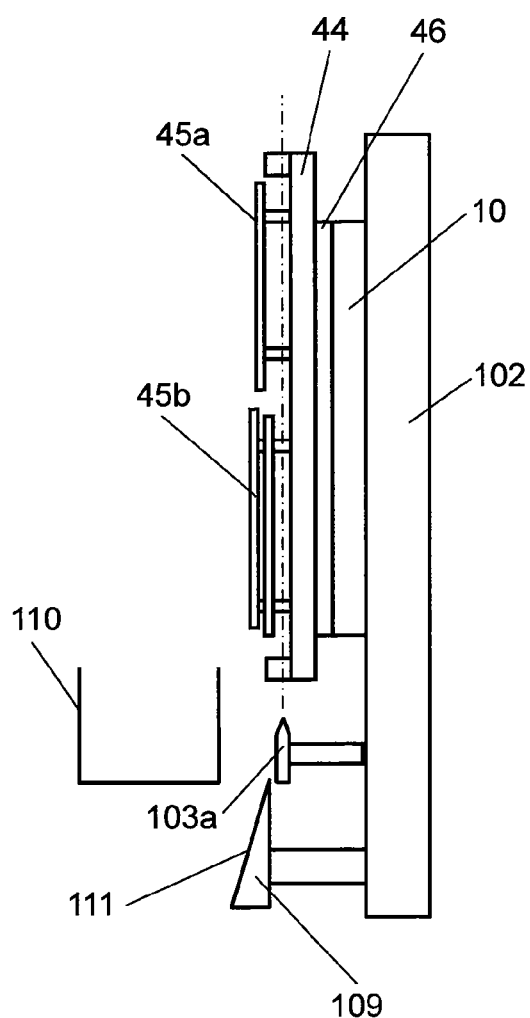
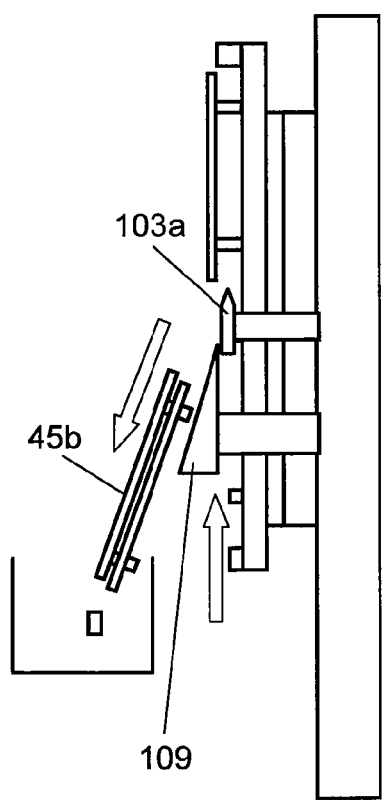

METHOD AND APPARATUS FOR DISASSEMBLING DISPLAY DEVICE

TECHNICAL FIELD

The present invention relates to a method and apparatus for disassembling display device, and more particularly to a disassembling method and disassembling apparatus capable of easily separating an electric circuit member from a chassis member in a short time in a plasma display device or the like having a metal plate such as the chassis member on its back surface.

BACKGROUND ART

Recently, as a display device appropriate to thinning and enlargement, liquid crystal display devices using a liquid crystal display panel and plasma display devices using a plasma display panel (hereinafter referred to as "PDP") have received attention and have been mass-produced, and the sale of them has hugely expanded.

A PDP is formed of a pair of glass substrates of a front plate and a back plate. The front plate has a display electrode pair, a dielectric layer, and a protective layer on the front glass substrate. The back plate has a data electrode, a barrier rib, and a phosphor layer on the back glass substrate. The front plate and back plate are faced to each other so that a micro discharge space is formed between them, and the peripheral parts of the front glass substrate and the back glass substrate are sealed with a sealing member. The discharge space is filled with discharge gas obtained by mixing neon (Ne) and xenon (Xe).

A metal plate as a chassis member is stuck on the back surface of the back plate of the PDP via an adhesive heat conductive sheet or a joint member such as an adhesive. The metal plate is a substrate to which an electric circuit member mounted with a driving circuit for driving the PDP is attached, and also has a function of efficiently radiating the heat generated in the PDP. The plasma display device is mounted with a front frame and back cover for protecting the PDP and electric circuit member.

Recently, as a great number of plasma display devices have become widespread, the number of used plasma display devices to be scrapped dramatically has increased. In this situation, the following treatment has become important from the viewpoint of an environmental issue and resource saving: a plasma display device including a failure caused in the manufacturing process and a used plasma display device that comes to the end of the product life to be scrapped are disassembled in a state where various members and materials are reusable at a low cost.

In order to disassemble a plasma display device in a reusable state, the plasma display device needs to be divided into a PDP mainly formed of a glass substrate, a metal plate as a chassis member, and an electric circuit member.

Conventionally, as a method of separating the PDP, metal plate, and electric circuit member from each other, the following documents are disclosed:
- a method of physically cutting and separating a joint member with a cutting tool such as a cutting edge (for example, patent literatures 1-3); and
- a method of cutting an attaching member for attaching the electric circuit member to the metal plate (for example, patent literature 4).

However, as the screen and size of a display device such as a plasma display device have been increased, the scale of a device for separation has increased and the joint area between the PDP and the metal plate has increased. Therefore, an excessive peeling force needs to be applied when they are separated from each other in the disassembling process. It therefore becomes difficult to take a physical action uniformly over the whole surface of a large display device. Disadvantageously, the glass substrate forming the PDP breaks, the productivity in a subsequent process of separating the glass substrate is reduced, or a failure occurs in recovering the material.

When the attaching member disposed in the metal plate is cut in order to separate and disassemble the electric circuit substrate from the metal plate of the chassis member, the load during cutting is un-uniform because the attaching member is arranged irregularly on the metal plate. Therefore, a cutting failure or cutting time loss occurs, the productivity and efficiency reduce in disassembling the display device, disadvantageously.

[Patent Literature 1] Unexamined Japanese Patent Publication No. 2004-184677

[Patent Literature 2] Unexamined Japanese Patent Publication No. 2006-330205

[Patent Literature 3] Unexamined Japanese Patent Publication No. 2006-243184

[Patent Literature 4] Unexamined Japanese Patent Publication No. 2006-320783

SUMMARY OF THE INVENTION

In the disassembling method of a display device of the present invention, the display device has the following elements:
- a display panel; and
- a panel member formed of a chassis member disposed on the back surface of the display panel and an electric circuit member attached to the chassis member by an attaching member.

The disassembling method has the following steps:
- a mounting step of mounting the panel member on a stage whose tilt angle can be adjusted by a tilt angle adjusting device; and
- a cutting step of cutting the attaching member in parallel with the surface of the stage with a cutting device that abuts on the attaching member by own weight of the panel member based on the tilt angle of the stage.

In this method, when the attaching member is cut by the cutting device and the electric circuit member is detached and separated from the chassis member, the tilt angle of the stage can be adjusted in response to the load by the tilt angle adjusting device. Therefore, even when attaching members of the electric circuit member are irregularly scattered, by adjusting the tilt angle of the stage in response to the load during cutting, a certain load can be applied to the cutting device by the own weight of the display device, and stable cutting is allowed. Thus, even when a large display device with a large screen is disassembled, a cutting failure or cutting time loss can be reduced, and an efficient and high-quality disassembling process of a PDP can be achieved.

In the disassembling apparatus of a display device of the present invention, the display device has the following elements:
- a display panel; and
- a panel member formed of a chassis member disposed on the back surface of the display panel and an electric circuit member attached to the chassis member by an attaching member.

The disassembling apparatus has the following elements:
- a stage having a tilt angle adjusting device for adjusting the tilt angle; and
- a cutting device for cutting an attaching member that abuts on it by its own weight based on the tilt angle of the panel member mounted on the stage.

In this configuration, when the attaching member is cut by the cutting device and the electric circuit member is detached and separated from the chassis member, the tilt angle of the stage can be adjusted in response to the load by the tilt angle adjusting device. Therefore, even when attaching members of the electric circuit member are irregularly scattered, by adjusting the tilt angle of the stage in response to the load during cutting, a certain load can be applied to the cutting device by the own weight of the display device, and stable cutting is allowed.

BRIEF DESCRIPTION OF DRAWINGS

FIG. 8A is a diagram showing a state before an attaching member is started to be cut by a disassembling apparatus of a disassembling method of a display device in accordance with a third exemplary embodiment of the present invention.

FIG. 8B is a diagram showing a state during cutting of the attaching member in the disassembling method.

Figure 1:
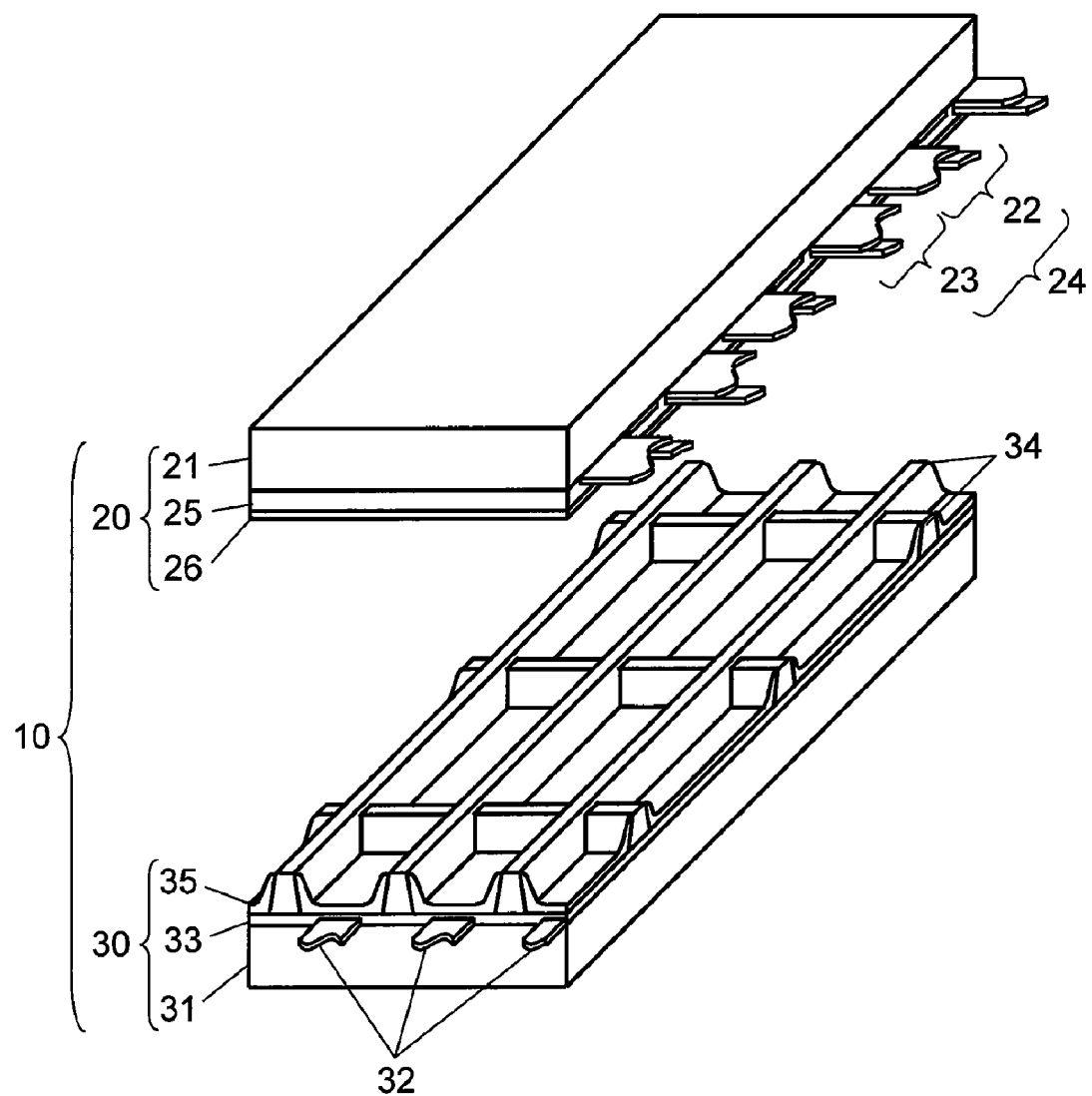
FIG. 1 is an exploded perspective view showing a fundamental structure of a PDP used in a plasma display device employing a disassembling method of a display device in accordance with a first exemplary embodiment of the present invention.

REFERENCE MARKS IN THE DRAWINGS 10 plasma display panel (PDP)
20 front plate
21 front glass substrate
22 scan electrode
23 sustain electrode
24 display electrode pair
25 dielectric layer
26 protective layer
30 back plate
31 back glass substrate
32 data electrode
33 base dielectric layer
34 barrier rib
35 phosphor layer
39 sealing member
40 plasma display device (plasma display device)
41 front frame
42 back cover
42a air vent
43 front cover
44 chassis member (metal support plate)
45, 45a, 45b circuit board
46 joint member
47 attaching surface
48 attaching member
49 metal plate unit
100 disassembling apparatus
101, 106 support section
101a mechanism section
101b control section
102 stage (mounting stand)
103 cutting section
103a saw blade
103b driving section
104 measuring section
105 data processing section
105a determining section
105b arithmetic section
107a, 107b added heavy object
109 discharge section
110 storage section
111 tilt plate

DETAILED DESCRIPTION OF PREFERRED EMBODIMENTS

Exemplary embodiments of the present invention will be described hereinafter with reference to the accompanying drawings. In the exemplary embodiments of the present invention, a plasma display device is described as an example of a display device.

First Exemplary Embodiment

FIG. 1 is an exploded perspective view showing a fundamental structure of a PDP used in a plasma display device employing a disassembling method of a display device in accordance with a first exemplary embodiment of the present invention. PDP 10 is formed of front plate 20 and back plate 30. Front plate 20 has front glass substrate 21, and a plurality of display electrode pairs 24 formed of scan electrodes 22 and sustain electrodes 23 are disposed in parallel on front glass substrate 21. Dielectric layer 25 is formed so as to cover scan electrodes 22 and sustain electrodes 23, and protective layer 26 is formed on dielectric layer 25.

Back plate 30 has back glass substrate 31, and a plurality of data electrodes 32 are formed in parallel on back glass substrate 31. Base dielectric layer 33 is formed so as to cover data electrodes 32, and mesh barrier ribs 34 are formed on dielectric layer 33. Phosphor layers 35 for sequentially emitting lights of respective colors of red, green, and blue for each data electrode 32 are formed on the side surfaces of barrier ribs 34 and on base dielectric layer 33.

Front plate 20 and back plate 30 are faced to each other so that display electrode pairs 24 cross data electrodes 32 with a micro discharge space sandwiched between them, and the outer peripheries of them are sealed by a sealing member such as glass frit. The discharge space is filled with mixed gas such as neon (Ne) and xenon (Xe) as discharge gas. The discharge space is partitioned into a plurality of sections by barrier ribs 34. Discharge cells are formed in the intersecting parts of display electrode pairs 24 and data electrodes 32. Then, discharge is caused in the discharge cells, the ultraviolet rays generated by the discharge excite phosphor layers 35 to emit light, thereby displaying a color image. The structure of PDP 10 is not limited to the above-mentioned one, but may be a structure having striped barrier ribs, for example.

Figure 2:
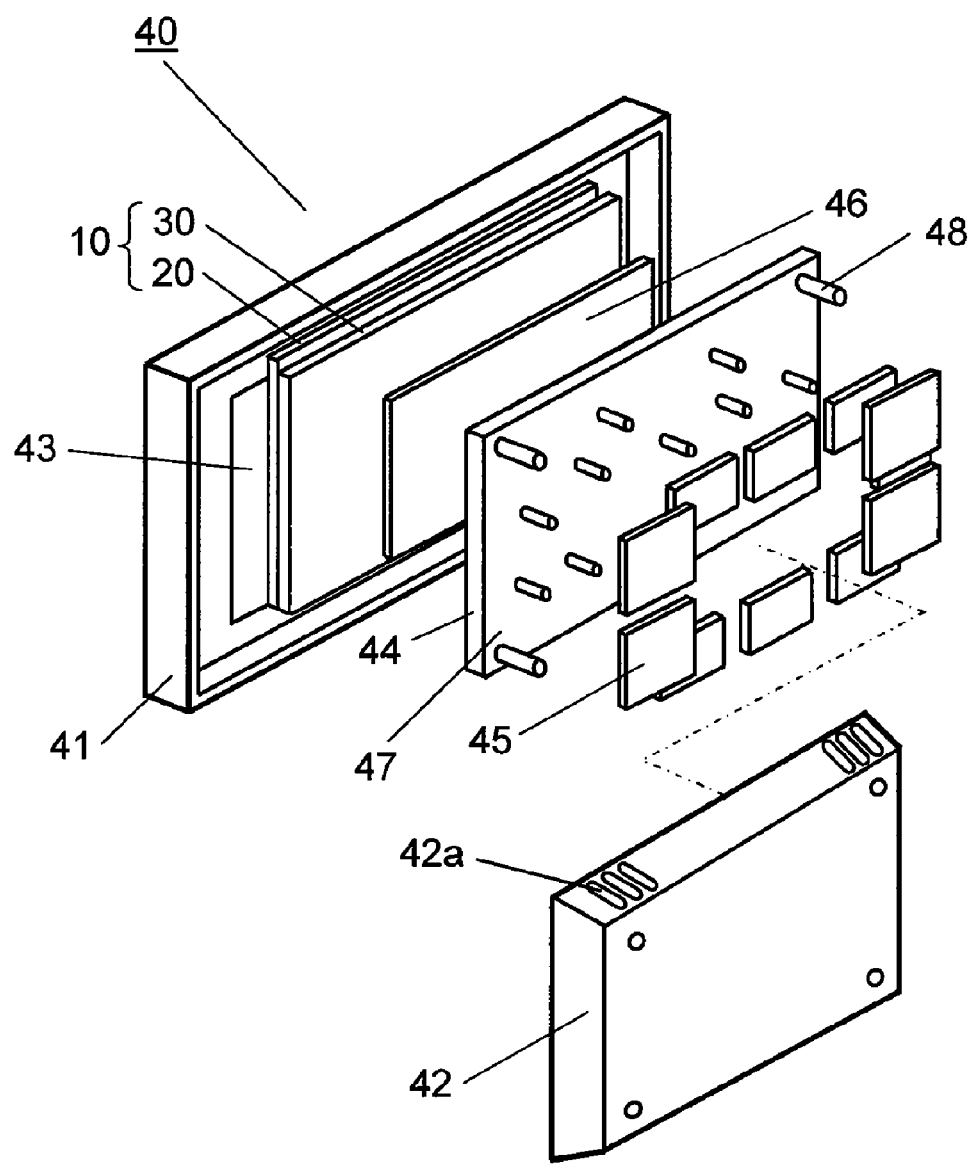
FIG. 2 is an exploded perspective view showing a configuration of the plasma display device.

FIG. 2 is an exploded perspective view showing a configuration of the plasma display device in accordance with the exemplary embodiment of the present invention. Plasma display device 40 (hereinafter also referred to as "plasma display device") has the following elements:

front frame 41 forming a case for storing PDP 10;
back cover 42;
front cover 43 such as glass disposed in an opening of front frame 41;
metal support plate 44 as a chassis member that is formed of a metal plate made of aluminum and serves also as a heat radiation plate;
circuit boards 45 forming a circuit block for driving PDP 10; and
joint member 46 joined to metal support plate 44 for transferring the heat generated from PDP 10 to metal support plate 44.

Joint member 46 is made of a material having adhesiveness or fusibility (hereinafter collectively referred to as "joining property"), and is joined to substantially whole surface of back plate 30 of PDP 10 and also to substantially whole surface of metal support plate 44.

Front cover 43 has both functions of serving as an optical filter and protecting PDP 10, and has undergone silver (Ag) deposition, for example, in order to suppress unnecessary radiation of electromagnetic wave. Back cover 42 has a plurality of air vents 42a for releasing the heat generated by PDP 10 or circuit boards 45 to the outside. Circuit boards 45 are attached to the back side of metal support plate 44, have an electric circuit for driving and controlling PDP 10, and are electrically connected to it through an electrode drawing section (not shown) drawn to an edge of PDP 10 and a plurality of flexible wiring boards (not shown). Back cover 42 and circuit boards 45 are fixed to attaching members 48 such as fixing pins disposed on attaching surface 47 on the opposite side to the surface to which joint member 46 of metal support plate 44 is stuck and joined.

Figure 3:
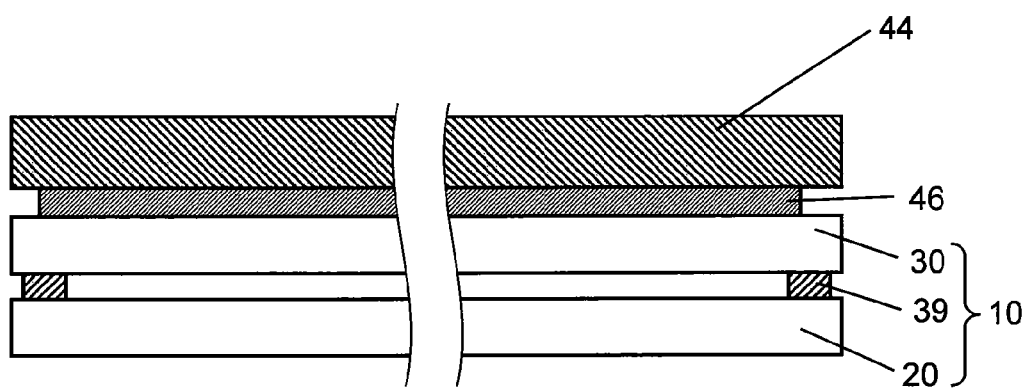
FIG. 3 is a sectional view showing a structure of a PDP of the plasma display device.

FIG. 3 is a sectional view showing a structure of PDP 10 of the plasma display device in accordance with the exemplary embodiment of the present invention. As shown in FIG. 3, the peripheries of front plate 20 and back plate 30 are sealed and joined by sealing member 39. Joint member 46 having joining property on its both surfaces is disposed on the back side of back plate 30 to join metal support plate 44 to PDP 10. Joint member 46 radiates the heat generated from PDP 10 to metal support plate 44, suppresses temperature increase of whole PDP 10, suppresses local temperature increase, and also suppresses breakage of front glass substrate 21 and back glass substrate 31 and image quality reduction of image display. Therefore, joint member 46 serves as a heat radiation sheet, is joined to substantially whole surface of back glass substrate 31 of back plate 30, and is joined to substantially whole surface of flat metal support plate 44.

The heat radiation sheet as joint member 46 is produced by kneading base material mainly made of acrylic copolymer with a metal flame retardant or urethane foam and by forming them in a sheet shape. Back glass substrate 31 of back plate 30 and the metal member of flat metal support plate 44 are stuck and joined to both surfaces of the heat radiation sheet. The adhesiveness is reduced or eliminated and the joint force is reduced at a temperature of 200° C. or higher.

Next, a disassembling method is described when, of such plasma display devices, a plasma display device including a failure caused in the manufacturing process or a used plasma display device that comes to the end of the product life to be scrapped is scrapped while various members and materials are reused and selected.

Figure 4:
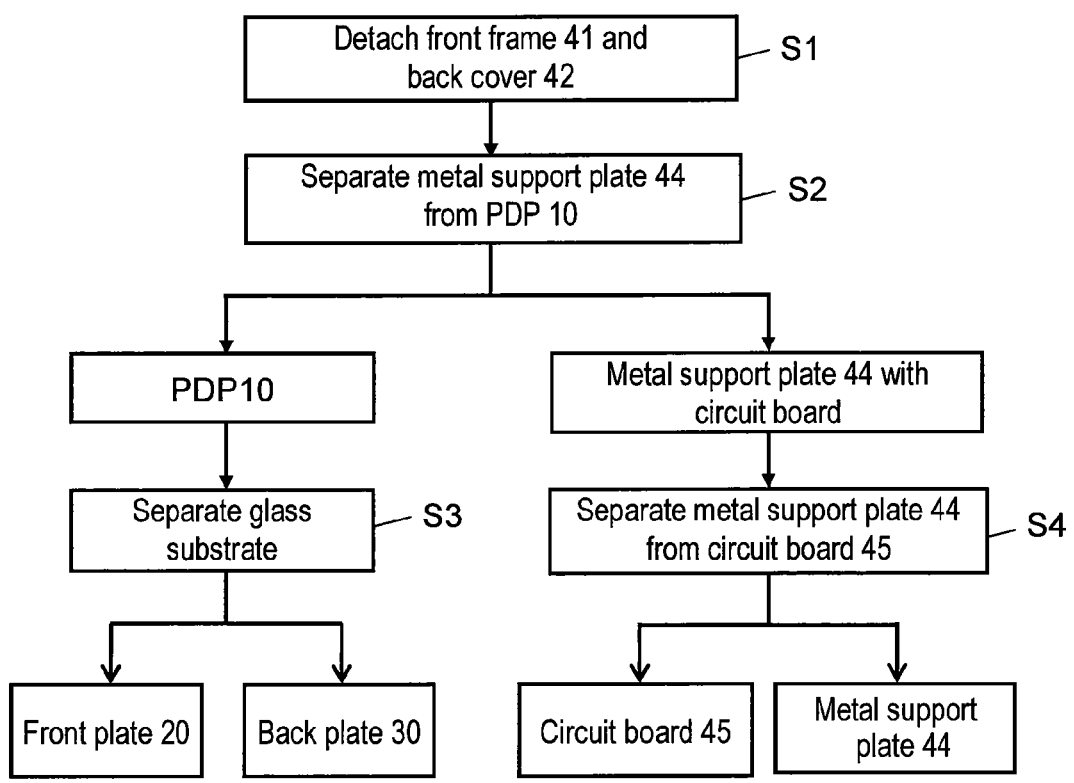
FIG. 4 is a flow chart showing a disassembling method of a plasma display device as the disassembling method of the display device of the first exemplary embodiment of the present invention.

FIG. 4 is a flow chart showing a disassembling method of a plasma display device, as the disassembling method of the display device of the first exemplary embodiment of the present invention. First, in step S1, front frame 41, back cover 42, and the other components are detached from plasma display device 40, and the PDP unit is taken out of the case of plasma display device 40.

Then, in step S2, PDP 10 is separated from metal support plate 44 to which circuit boards 45 are fixed through attaching members 48. As a separating method, a method of reducing or eliminating the joint force by heating joint member 46 for joining metal support plate 44 to PDP 10 to about 200° C. or higher can be used. Thus, PDP 10 can be separated from metal support plate 44 that has circuit boards 45 and is joined to PDP 10 through joint member 46.

Next, in step S3, the glass substrate is separated from PDP 10. Front plate 20 can be separated from back plate 30 by cutting and separating the region of sealing member 39 for joining front glass substrate 21 to back glass substrate 31. Then, by a method of removing components such as an electrode and dielectric layer that are formed on the glass substrate and of recovering and re-dissolving the glass substrate, the glass substrate is recycled. In step S4, circuit boards 45 are separated from metal support plate 44.

The components separated in respective steps are further separated and classified, and recycled or scrapped. In an enlarged plasma display device having a large screen, PDP 10 joined to metal support plate 44 needs to be separated with high productivity in a state where front glass substrate 21 and back glass substrate 31 are not broken.

Next, regarding substrate separating step S4 of separating circuit boards 45 from metal support plate 44, the features of the disassembling method of the embodiment of the present invention and the disassembling apparatus used for it are described using FIG. 5.

FIG. 5 is a diagram showing a process of separating circuit boards 45 from metal support plate 44 in step S4 of the disassembling method of the display device in accordance with the first exemplary embodiment of the present invention shown in FIG. 4.

Figure 5A:
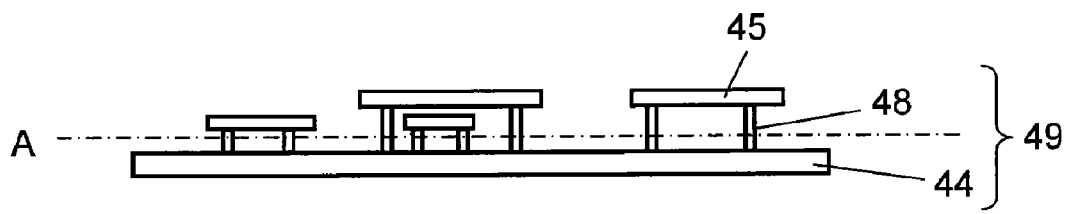
FIG. 5A is a diagram showing a state where a circuit board is attached to a metal support plate of the display device.
Figure 5B:
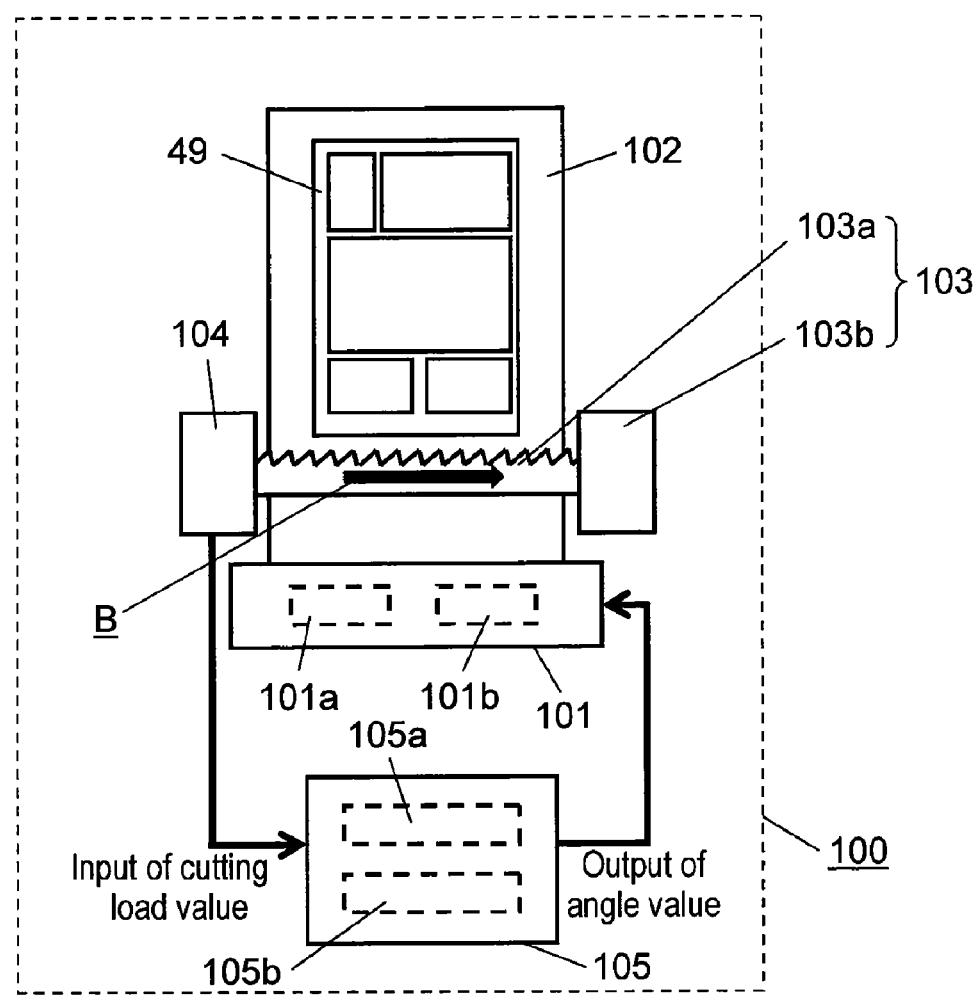
FIG. 5B is a front view showing a configuration of a disassembling apparatus in accordance with a first exemplary embodiment of the present invention.
Figure 5C:
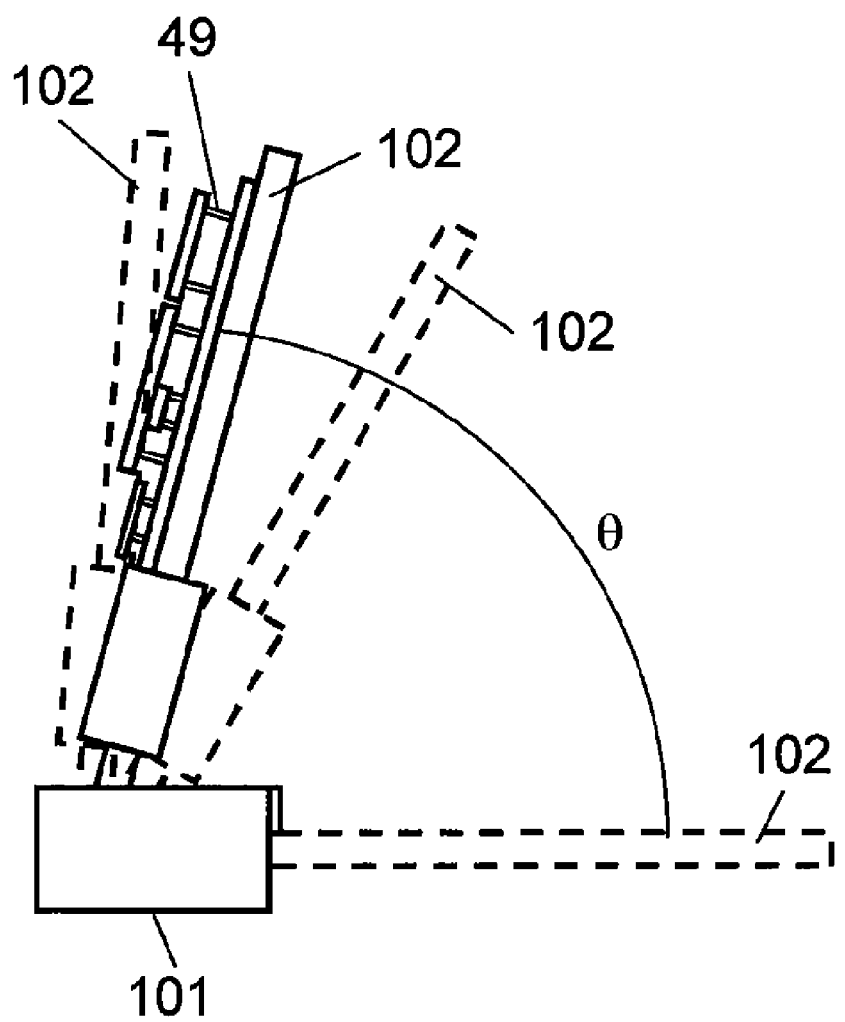
FIG. 5C is a side view of the disassembling apparatus.

FIG. 5A is a diagram showing a state where circuit boards 45 are attached to metal support plate 44. FIG. 5B is a front view showing a configuration of the disassembling apparatus. FIG. 5C is a side view of the disassembling apparatus.

As shown in FIG. 5, for separating circuit boards 45 from metal support plate 44, metal plate unit 49 as a panel member and disassembling apparatus 100 are used. Metal plate unit 49 as a panel member has metal support plate 44 as a chassis member, circuit boards 45 as an electric circuit member, and attaching members 48 for attaching circuit boards 45.

Circuit boards 45 are fixed to metal support plate 44 through attaching members 48 such as bosses (columns) made of metal or resin. Disassembling apparatus 100 is disposed in a circuit board separating process (hereinafter referred to as "the present process") of separating circuit boards 45 from metal plate unit 49 in a disassembling line of the plasma display device.

The features of the present process are hereinafter described using FIG. 5A and FIG. 5B. In the present process, attaching members 48 on metal plate unit 49 are cut by disassembling apparatus 100 using position A as a cutting surface, for example.

As shown in FIG. 5B and FIG. 5C, disassembling apparatus 100 has support section 101, stage (mounting stand) 102, cutting section 103, measuring section 104, and data processing section 105. Support section 101 is a base structure section of disassembling apparatus 100, and has mechanism section 101a and control section 101b as an angle adjusting device for angle-variably holding stage 102 inside it. Stage 102 is held by support section 101, is engaged with an angle varying mechanism (not shown) disposed in support section 101, and can vary the tilt angle from the horizontal direction to the vertical direction. Stage 102 has sufficient space capable of positioning and mounting metal plate unit 49. Position A as the cutting surface is in parallel with the surface of stage 102.

Cutting section 103 has saw blade 103a as the cutting device and driving section 103b for driving saw blade 103a in a belt shape, for example in the arrow B direction. Saw blade 103a is disposed in a lower part of stage 102, and is disposed at a position where attaching members 48 positioned on stage 102 can be cut. As the cutting device, a method of driving the saw blade in a reciprocating motion, a method of driving the saw blade in a belt shape, and a method of rotating a rotary blade with a disk shape can be used.

Measuring section 104 has a torque sensor or the like, and a function of detecting a cutting load based on the abutting of cutting section 103 on attaching members 48. Data processing section 105 has determining section 105a and arithmetic section 105b. Data processing section 105 can also perform various arithmetic processing and data management, for example, by receiving the cutting load value in the cutting section 103 from measuring section 104 and calculating the tilt angle of stage 102.

In the present process, in disassembling apparatus 100, metal plate unit 49 is disposed on stage 102 whose tilt angle is variable so that saw blade 103a as the cutting device passes between the back surface of metal support plate 44 and circuit boards 45. Then, at least one of saw blade 103a and metal plate unit 49 is moved and attaching members 48 are cut. At this time, metal plate unit 49 is butted on saw blade 103a by own weight, the load is measured, angle Θ of stage 102 is adjusted, thereby adjusting the load by the own weight of metal plate unit 49 to make the load on saw blade 103a constant.

Next, a step of separating circuit boards 45 from metal support plate 44 is described in detail using FIG. 5A through FIG. 5C and FIG. 6.

Figure 6:
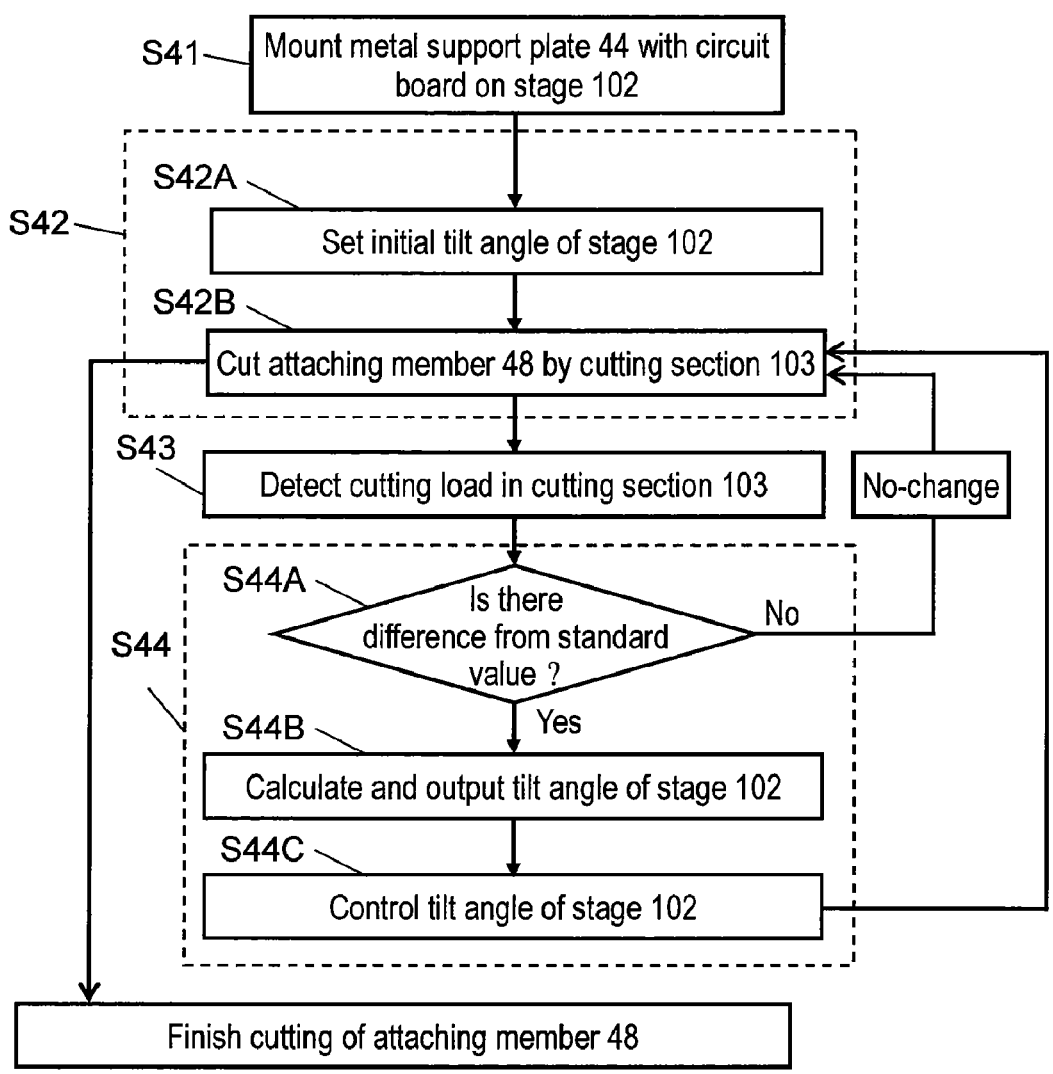
FIG. 6 is a flow chart showing a detailed procedure of step S4 of the disassembling method.

FIG. 6 is a flow chart showing a detailed procedure of step S4 of the disassembling method of the display device in accordance with the first exemplary embodiment of the present invention shown in FIG. 4. As shown in FIG. 5, step S4 of cutting attaching members 48 with saw blade 103a and detaching circuit boards 45 from chassis member 44 mainly includes mounting step S41, cutting step S42, load detecting step S43, and angle adjusting step S44.

In mounting step S41, metal support plate 44 (hereinafter referred to as "metal plate unit 49") to which circuit boards 45 are attached through attaching members 48 is mounted as a panel member on stage 102 of disassembling apparatus 100. When mounting step S41 is started, stage 102 is kept horizontally, and metal plate unit 49 is automatically supplied from a storage place. The function and operation of disassembling apparatus 100 are described later.

Cutting step S42 includes initializing step S42A of setting an initial tilt angle of stage 102, and attaching-member cutting step S42B of cutting attaching members 48 with saw blade 103a as the cutting device. In initializing step S42A, the positional regulation required for executing the following steps is applied to metal plate unit 49 mounted on stage 102 of disassembling apparatus 100, and then the tilt angle of stage 102 is initialized. The initialized angle is determined by previous experiment or the like. In cutting step S42B, when the tilt angle of stage 102 is initialized to θ for example, the tilting causes metal plate unit 49 to slip down on stage 102 by its own weight, and saw blade 103a of cutting section 103 comes into contact with attaching members 48 of metal plate unit 49 at the position of cutting surface A. Driving section 103b drives saw blade 103a to cut attaching members 48.

In load detecting step S43, the load when attaching members 48 are cut by saw blade 103a of cutting section 103 is detected. Measuring section 104 serving as a load detector of disassembling apparatus 100 measures the torque value of driving section 103b as the load during the cutting in cutting step S42B, and data related to the measuring result is transmitted to a determining section (not shown) as a low-order function of data processing section 105.

In angle adjusting step S44, the tilt angle of stage 102 of disassembling apparatus 100 is adjusted in response to the load detected in load detecting step S43. Angle adjusting step S44 has load-value determining step S44A of comparing the load value detected in load detecting step S43 with a standard value and performing determination, arithmetic step S44B of calculating and outputting the tilt angle of stage 102 based on the determination result, and control step S44C of controlling the tilt angle of stage 102.

In load value determining step S44A, based on the data received from measuring section 104, determining section 105a in data processing section 105 compares the load value detected in load detecting step S43 with the preset standard value, and determines the existence of the difference using a threshold. When "no existence" of the difference is determined, attaching member cutting step S42B is continued, and load detecting step S43 is repeated at a predetermined timing. When "existence" of the difference is determined, data related to the determination result is transmitted to arithmetic section 105b.

In arithmetic step S44B, based on the data received from determining section 105a, arithmetic section 105b performs arithmetic processing with a predetermined created program, and calculates the tilt angle to be corrected (or set) with respect to stage 102. Arithmetic section 105b also transmits the data related to the calculation result to control section 101b in support section 101.

In control step S44C, control section 101b controls and corrects the tilt angle of stage 102 based on the data received from arithmetic section 105b. Thus, the tilt angle of stage 102 is optimized, and the process goes to attaching member cutting step S42B. In other words, in response to the detected load, the tilt angle is adjusted. When the load is small, the tilt angle of stage 102 is increased to increase the load that is applied to saw blade 103a by gravity from metal plate unit 49. When the load is large, the tilt angle is decreased to decrease the load that is applied to saw blade 103a.

By repeating operation of step S42B through step S44C, the cutting work of attaching members 48 is continued while the load during the cutting of disassembling apparatus 100 is kept constant, the cutting of all attaching members 48 is completed, and the present process is completed.

Second Exemplary Embodiment

Figure 7:
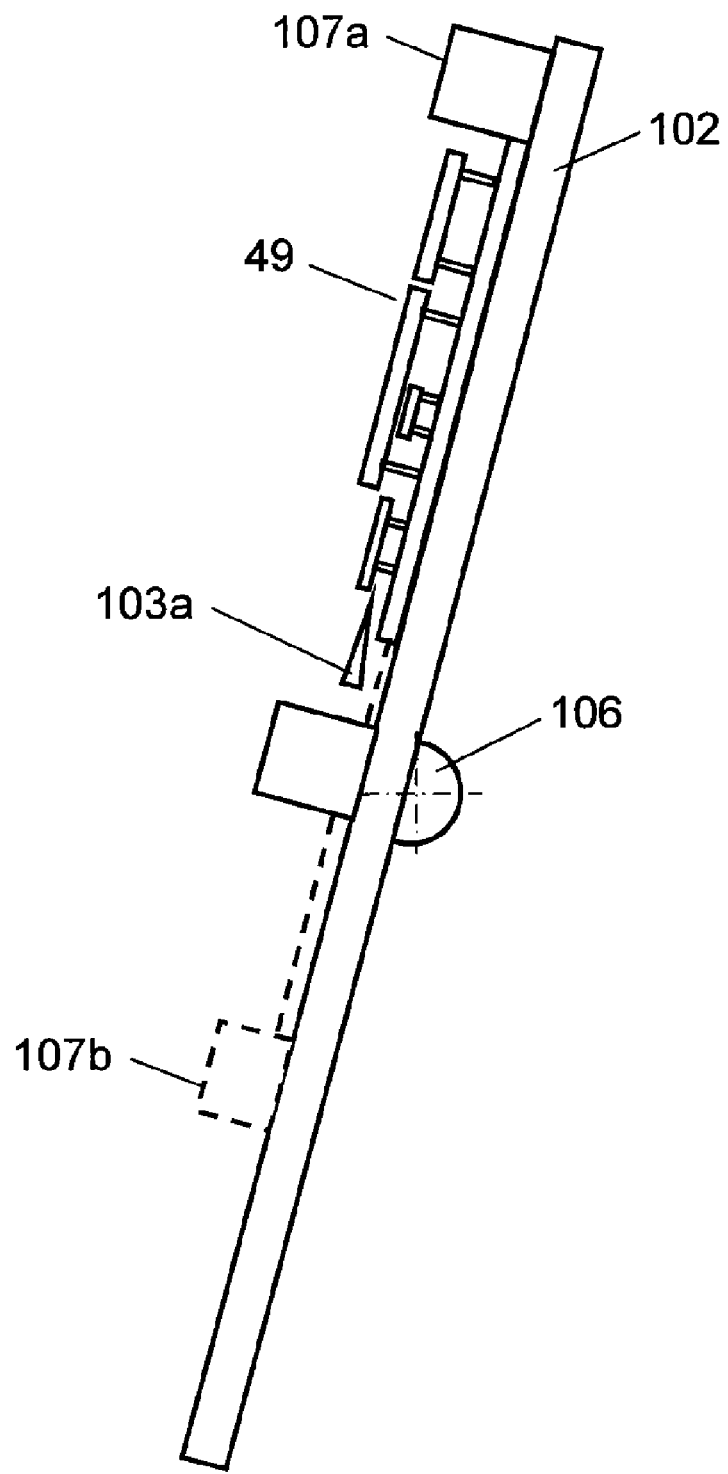
FIG. 7 is a diagram showing a disassembling method of a display device in accordance with a second exemplary embodiment of the present invention.

FIG. 7 is a diagram showing a disassembling method of a display device in accordance with a second exemplary embodiment of the present invention.

In FIG. 7, in disassembling apparatus 100, support section 106 of stage 102 is disposed in a central part of stage 102, and the weight of stage 102 is set greater than that of metal plate unit 49. Therefore, the weight can be kept in balance with respect to variation in the tilt angle of stage 102, and the power for controlling the tilt angle can be reduced.

Disassembling apparatus 100 has added heavy object 107a or added heavy object 107b for increasing the abutting force at which metal plate unit 49 as a panel member abuts on saw blade 103a as the cutting device. Added heavy object 107a may press down metal plate unit 49, or added heavy object 107b shown by dotted line may be suspended on the saw blade 103a side to pull down metal plate unit 49.

In these disassembling methods, a predetermined weight is applied to metal plate unit 49 as a part of the panel member using added heavy objects 107a and 107b, thereby allowing metal plate unit 49 to move on stage 102.

Therefore, appropriate load required for cutting can be applied when the panel member has an insufficient weight to apply a load required for cutting attaching members 48 or when the weight depends on the device type. A practical disassembling method applicable to display devices having different weights can be provided.

In the above description, metal plate unit 49 moves on stage 102. However, saw blade 103a as the cutting device may be moved.

According to the load of measuring section 104 as a load detector, the operation speed, namely relative moving speed, between metal plate unit 49 as the panel member and saw blade 103a as the cutting device may be adjusted. The cutting speed such as the reciprocating speed of saw blade 103a may be adjusted.

Third Exemplary Embodiment

FIG. 8A and FIG. 8B are diagrams showing a disassembling method of a display device in accordance with a third exemplary embodiment of the present invention. In disassembling apparatus 100 using the disassembling method of the display device in accordance with the third exemplary embodiment, discharge section 109 for specifying discharge of disassembled and separated circuit boards 45 is disposed on stage 102.

FIG. 8A and FIG. 8B show the case that PDP 10 and metal support plate 44 are mounted on stage 102 in an integrated state through joint member 46, and the case that metal support plate 44 is separated from circuit boards 45 from this state. Discharge section 109 is disposed near saw blade 103a, and is arranged so as to make the relative distance to saw blade 103a constant. Discharge section 109 has tilt plate 111 so that the discharge direction of circuit boards 45 separated by cutting of attaching members 48 by saw blade 103a is specified and circuit boards 45 are guided to storage section 110.

FIG. 8A shows the state before disassembling apparatus 100 starts to cut attaching members 48, and FIG. 8B shows the state during cutting. Discharge section 109 is disposed under saw blade 103a (behind the cutting position), and attaching members 48 are cut while saw blade 103a is interlocked with discharge section 109 to keep the relative distance constant.

Therefore, saw blade 103a or metal plate unit 49 is moved, and circuit boards 45a and 45b attached to metal support plate 44 through attaching members 48 are sequentially cut. At this time, as shown in FIG. 8B, the discharge direction of circuit board 45b separated from metal support plate 44 is specified by tilt plate 111 of discharge section 109, and circuit board 45b is dropped and stored in a storage vessel having storage section 110.

In this disassembling method, discharge section 109 disposed under saw blade 103a as the cutting device allows specification of discharge of circuit boards 45a and 45b separated by cutting of attaching members 48, and allows efficient collecting work. Therefore, in disassembling the display device, additional process and facility for collecting the discharge objects generated by cutting of the attaching members are not required, and the simplification and productivity can be improved.

FIG. 8A and FIG. 8B show the states where stage 102 is arranged vertically, but this disassembling method can be applied to the case that the tilt angle of stage 102 is adjusted as discussed in the first exemplary embodiment or second exemplary embodiment.

The descriptions of first exemplary embodiment and second exemplary embodiment of the present invention have shown a method of separating the display panel from the display device and then separating the circuit boards from the metal plate unit formed of the chassis member and the electric circuit member. However, the disassembling methods of the first exemplary embodiment and second exemplary embodiment can be applied to the case that the circuit boards are separated from the display device where the display panel is integrated with the chassis member.

As discussed above, the disassembling method and disassembling apparatus of the display device of the exemplary embodiment of the present invention can keep the load during cutting constant when the electric circuit member is detached and separated from the chassis member. Therefore, even when the attaching members are scattered irregularly, a constant load can be applied to the cutting device, and stable cutting is allowed. Therefore, the cutting failure or cutting time loss can be reduced even in a large display device with a large screen.

INDUSTRIAL APPLICABILITY

The disassembling method and disassembling apparatus of the display device of the present invention allow a metal plate and a glass substrate to be separated and disassembled with high productivity regardless of the size of the display device, and especially are useful as a disassembling method of the display device with a large screen.

The invention claimed is:
1. A disassembling method of a display device, the display device comprising:
   a display panel; and
   a panel member formed of a chassis member and an electric circuit member, the chassis member being disposed on a back surface of the display panel, the electric circuit member being attached to the chassis member through an attaching member,
   the disassembling method comprising:
      mounting the panel member on a stage whose tilt angle is adjustable upward by a tilt angle adjusting device; and
      cutting the attaching member in parallel with a surface of the stage with a cutting device that abuts on the attaching member by own weight of the panel member based on the tilt angle upward of the stage.

2. The disassembling method of the display device of claim 1, further comprising:
a load detector for detecting a load based on abutting of the attaching member on the cutting device,
wherein the tilt angle adjusting device adjusts a load applied to the cutting device to be constant.

3. The disassembling method of the display device of claim 2, further comprising:
a discharge section that is at a constant relative distance from the cutting device and regulates a discharge direction of the electric circuit member cut by the cutting device.

4. The disassembling method of the display device of claim 1, further comprising:
a discharge section that is at a constant relative distance from the cutting device and regulates a discharge direction of the electric circuit member cut by the cutting device.

5. The disassembling method of the display device of claim 1, further comprising:
a heavy object for increasing an abutting force by abutting of the panel member on the cutting device.

6. The disassembling method of the display device of claim 5, wherein the heavy object is suspended on a side of the cutting device of the panel member.

7. The disassembling method of the display device of claim 1, wherein operation speeds of the cutting device and the panel member are adjusted in response to the load detected by the load detector.

8. A disassembling apparatus of a display device, the display device comprising:
a display panel; and
a panel member formed of a chassis member and an electric circuit member, the chassis member being disposed on a back surface of the display panel, the electric circuit member being attached to the chassis member through an attaching member,
the disassembling apparatus comprising:
a stage having a tilt angle adjusting device for adjusting upward a tilt angle; and
a cutting device for cutting the attaching member, the attaching member abutting on the cutting device by own weight of the panel member mounted on the stage based on the tilt angle upward.

9. The disassembling apparatus of the display device of claim 8, further comprising:
a load detector for detecting a load based on abutting of the attaching member on the cutting device.

10. The disassembling apparatus of the display device of claim 9, further comprising:
a discharge section that is at a constant distance from the cutting device and regulates a discharge direction of the electric circuit member cut by the cutting device.

11. The disassembling apparatus of the display device of claim 8, further comprising:
a discharge section that is at a constant distance from the cutting device and regulates a discharge direction of the electric circuit member cut by the cutting device.

* * * * *